US009044891B2

(12) United States Patent
Murata

(10) Patent No.: US 9,044,891 B2
(45) Date of Patent: Jun. 2, 2015

(54) CONTROL DEVICE OF AN INJECTION MOLDING MACHINE

(71) Applicant: NISSEI PLASTIC INDUSTRIAL CO., LTD., Nagano-ken (JP)

(72) Inventor: Hirofumi Murata, Nagano-ken (JP)

(73) Assignee: NISSEI PLASTIC INDUSTRIAL CO., LTD., Hanishina (JP)

( * ) Notice: Subject to any disclaimer, the term of this patent is extended or adjusted under 35 U.S.C. 154(b) by 96 days.

(21) Appl. No.: 13/690,171

(22) Filed: Nov. 30, 2012

(65) Prior Publication Data

US 2013/0142899 A1 Jun. 6, 2013

(30) Foreign Application Priority Data

Dec. 2, 2011 (JP) ................. 2011-265283

(51) Int. Cl.
*B29C 45/78* (2006.01)
*B29C 45/80* (2006.01)
*B29C 45/76* (2006.01)

(52) U.S. Cl.
CPC ........... *B29C 45/7653* (2013.01); *B29C 45/766* (2013.01); *B29C 2045/7606* (2013.01)

(58) Field of Classification Search
CPC ................. B29C 45/7653; B29C 45/7606
USPC ............... 425/140, 145, 148, 149, 150
See application file for complete search history.

(56) References Cited

U.S. PATENT DOCUMENTS

| 5,340,297 | A | * | 8/1994 | Takizawa et al. | ............ | 425/145 |
| 6,589,039 | B1 | * | 7/2003 | Doughty et al. | ............ | 425/145 |
| 6,649,095 | B2 | * | 11/2003 | Buja | ............ | 264/40.6 |
| 6,848,895 | B2 | * | 2/2005 | Konishi et al. | ............ | 425/130 |
| 2006/0246167 | A1 | * | 11/2006 | Buja | ............ | 425/144 |

FOREIGN PATENT DOCUMENTS

| JP | 55-67435 A | 5/1980 |
| JP | 2007-118349 A | 5/2007 |

OTHER PUBLICATIONS

Cincinnati Milacron pamphlet entitled "Complete Automatic Manufacturing Activity Control" published 1984, pp. 1-6.*
Cincinnati Milacron pamphlet entitled "Complete Automatic Manufacturing Activity Control" publ;ished 1984, pp. 1-6 (clean copy).*

* cited by examiner

*Primary Examiner* — Tim Heitbrink
(74) *Attorney, Agent, or Firm* — Birch, Stewart, Kolasch & Birch, LLP

(57) ABSTRACT

An injection molding machine includes a molding machine controller having a computer function to perform molding by controlling a mold clamping device that clamps a mold and an injection device that injects and charges resin, plasticized and molten by rotation of a screw inside a heating cylinder, into the mold by advancement of the screw. The molding machine controller includes a mode selecting function that selects either of two modes of an injection side setting priority mode for injecting and charging the resin by giving priority to a molding condition set on the injection device side and a mold clamping side setting priority mode for injecting and charging the resin by giving priority to a molding condition set on the mold clamping device side. A setting screen display function for displaying an injection side priority setting screen and displaying a mold clamping side priority setting screen is provided.

15 Claims, 10 Drawing Sheets

Fig. 8

| CLAMPING FORCE [kN] | MOLDING CLEARANCE [mm] | REMAINING CLEARANCE [mm] | FINS | SINK MARKS | WARPAGE | DEGASSING | |
|---|---|---|---|---|---|---|---|
| 40 | 0 | 0 | VERY GOOD | POOR | RELATIVELY POOR | RELATIVELY POOR | |
| 35 | 0 | 0 | VERY GOOD | POOR | RELATIVELY POOR | RELATIVELY POOR | |
| 30 | 0 | 0 | VERY GOOD | POOR | RELATIVELY POOR | FAIR | |
| 25 | 0.01 | 0 | VERY GOOD | RELATIVELY POOR | FAIR | FAIR | |
| 20 | 0.02 | 0 | VERY GOOD | FAIR | FAIR | VERY GOOD | |
| 18 | 0.03 | 0 | VERY GOOD | VERY GOOD | VERY GOOD | VERY GOOD | Zu |
| 16 | 0.1 | 0.01 | VERY GOOD | VERY GOOD | VERY GOOD | VERY GOOD | |
| 15 | 0.15 | 0.02 | VERY GOOD | VERY GOOD | VERY GOOD | VERY GOOD | |
| 14 | 0.17 | 0.03 | VERY GOOD | VERY GOOD | VERY GOOD | VERY GOOD | |
| 13 | 0.2 | 0.04 | GOOD | VERY GOOD | VERY GOOD | VERY GOOD | |
| 12 | 0.3 | 0.1 | FAIR | VERY GOOD | VERY GOOD | VERY GOOD | |
| 11 | 0.4 | 0.3 | RELATIVELY POOR | VERY GOOD | VERY GOOD | VERY GOOD | Zus |
| 10 | 0.5 | 0.4 | POOR | VERY GOOD | VERY GOOD | VERY GOOD | |

Fig. 9

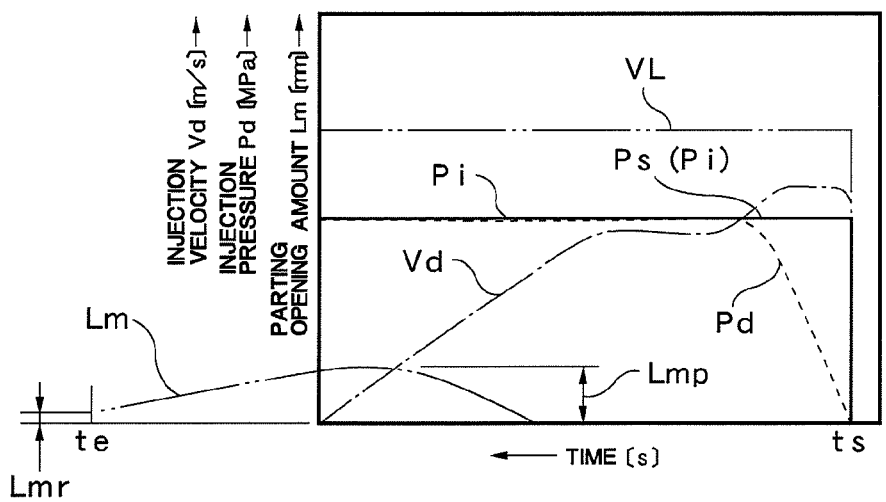

CONTROL DEVICE OF AN INJECTION MOLDING MACHINE

TECHNICAL FIELD

The present invention relates to a control device of an injection molding machine having a molding machine controller that performs molding by controlling an injection device and a mold clamping device.

BACKGROUND ART

Control devices of injection molding machines, each including a molding machine controller having a computer function to perform molding by respectively controlling a mold clamping device that clamps (also opens and closes) a mold and an injection device that injects and charges resin, plasticized and molten by rotation of a screw inside a heating cylinder, into the mold by advancement of the screw, are conventionally known. According to such a control device, the molding is usually performed by controlling the mold clamping device to clamp the mold with a high-pressure clamping force, and controlling the injection device by preset molding conditions (an injection velocity, a screw position, a V-P (velocity-pressure) switchover point, a dwelling force and the like) to inject and charge the resin into the mold (refer to Patent Literature 1).

Meanwhile, there is a demand for energy saving of industrial machinery including the injection molding machine, from the viewpoint of global environmental protection such as reduction of carbon dioxide emissions, resource conservation and the like. The present inventor has already proposed an injection molding method capable of responding to the demand in Patent Literature 2. It is an object of this injection molding method to respond to the demand for the energy saving from the viewpoint of the global environmental protection such as the reduction of carbon dioxide emissions, the resource conservation and the like, by applying only a required amount of pressure to the mold when necessary. Specifically, at the time of performing injection molding by injecting and charging molten resin from the injection device into the mold having a fixed mold and a movable mold supported by a mold opening/closing device, a clearance (set interval) between the fixed mold and the movable mold is set in advance in which the molten resin does not enter at the time of injection molding. At the time of molding, the molten resin is injected and charged from the injection device into the mold that is closed while leaving the clearance of the set interval, and position control of the movable mold is performed so that the set interval is fixed at least during injection and charging.

SUMMARY OF INVENTION

Technical Problem

However, the conventional molding methods by the control devices mounted on the injection molding machines, including the injection molding method according to the above-described Patent Literature 2, have the following problems to be solved.

First, mold clamping conditions of the mold clamping device are basically set as fixed conditions and based on the conditions, injection conditions of the injection device are set. Therefore, even when the injection conditions are set precisely and appropriately, the resin charged into the mold is influenced by temperature fluctuations of the mold, a mold clamping mechanism and the like, and quality and homogeneity of final molded items are also influenced thereby. Such problems get worse especially when the resin has a property that is highly susceptible to temperatures, pressures and the like, and such resin is not satisfactory from the viewpoint of securing high quality of a molded item.

Second, the molding conditions are mainly set on the injection device side, and it is necessary to set the various molding conditions including the injection conditions such as the injection velocity, a velocity switchover position, the V-P switchover point, an injection pressure, the dwelling force and the like requiring accuracy, and also measuring conditions such as the screw position and the like requiring accurate measurement. Consequently, setting operations of the molding conditions are complicated, and operation control at the time of molding is troublesome. In addition, a series of control operations, including multi-stage control of the injection velocity, control of the dwelling force and the like, are usually required, so that a molding cycle time tends to get longer. This results in limitations in shortening the molding cycle time and improving mass productivity.

Third, there is only a single molding method (molding system) and the molding system lacks in variation. Therefore, at the time of molding, users have no choice of selecting different molding systems for the various molded items with different forms and materials, and molding processing lacks in variety and flexibility. Thus, there is a room for a further improvement from the viewpoint of optimizing the molding processing, improving the quality of the molded items, and improving added values and marketability of the injection molding machine.

Solution to Problem

The present invention is made to solve the above-described problems, and a control device 1 of an injection molding machine M is structured to include a molding machine controller 5 having a computer function to perform molding by controlling a mold clamping device Mc that clamps (also opens and closes) a mold 2 and an injection device Mi that injects and charges resin, plasticized and molten by rotation of a screw 4 inside a heating cylinder 3, into the mold 2 by advancement of the screw 4. The molding machine controller 5 includes a mode selecting function Fm that selects either of two modes Ei and Ec, that is, an injection side setting priority mode Ei for injecting and charging the resin by giving priority to a molding condition set on the injection device Mi side, and a mold clamping side setting priority mode Ec for injecting and charging the resin by giving priority to a molding condition set on the mold clamping device Mc side, and a setting screen display function Fd for displaying on a display 6 an injection side priority setting screen Vi corresponding to the injection side setting priority mode Ei when the injection side setting priority mode Ei is selected, and displaying on the display 6 a mold clamping side priority setting screen Vc corresponding to the mold clamping side setting priority mode Ec when the mold clamping side setting priority mode Ec is selected.

Advantageous Effects of Invention

Thus-structured control device 1 of the injection molding machine M according to this invention has pronounced effects as follows.

(1) There are the mode selecting function Fm that selects either the injection side setting priority mode Ei for injecting and charging the resin by giving priority to the molding conditions set on the injection device Mi side or the mold clamping side setting priority mode Ec for injecting and charging the resin by giving priority to the molding conditions set on the mold clamping device Mc side, and the setting screen display function Fd for displaying on the display 6 the injection side priority setting screen Vi corresponding to the injection side setting priority mode Ei when the injection side setting priority mode Ei is selected, and displaying on the display 6 the mold clamping side priority setting screen Vc corresponding to the mold clamping side setting priority mode Ec when the mold clamping side setting priority mode Ec is selected. Thus, when performing the molding, the users can select from the modes of the two different molding systems for the various molded items with the different forms and materials. This results in an improvement in the variety and flexibility of the molding processing, optimization of the molding processing by selecting the different molding systems, an improvement in the quality of the molded items, and also an improvement in the added values and marketability of the injection molding machine.

(2) When the mold clamping side setting priority mode Ec is selected, the settings on the various molding conditions are not required, the conditions including the injection conditions such as the injection velocity, the V-P switchover point, the dwelling force and the like that require accuracy and influence each other, and also the measuring conditions such as the screw position and the like that require accurate measurement. This makes it possible to simplify and facilitate the settings of the molding conditions, facilitate quality control, and also facilitate operation control at the time of manufacturing. Further, a series of the control operations, including the multi-stage control of the injection velocity and the control of the dwelling force, are not required, so that the molding cycle time can be shortened and the mass productivity and economic efficiency can be improved.

(3) According to a preferred aspect, the setting screen display function Fd allows the injection side priority setting screen Vi and the mold clamping side priority setting screen Vc to display a part of or the entire setting units Viv . . . regarding the identical setting targets at the identical positions, respectively, so as to improve usability when switching between the mold clamping side priority setting screen Vc and the injection side priority setting screen Vi. Further, when the setting units Vic . . . in the injection side priority setting screen Vi, which are not required in the mold clamping side priority setting screen Vc, are allowed to be not settable in the mold clamping side priority setting screen Vc, it is possible to prevent unnecessary confusion and setting errors at the time of setting, and to further improve convenience of the user.

(4) According to a preferred aspect, when the setting units Vic . . . of the injection side priority setting screen Vi that are not necessary in the mold clamping side priority setting screen Vc are not displayed in the mold clamping side priority setting screen Vc, and a non-display area Vco is provided in the mold clamping side priority setting screen Vc, the unnecessary setting items Dx . . . are not displayed in the mold clamping side priority setting screen Vc, and the simplest display is realized. This contributes to an improvement in setting easiness including visibility, operability and the like.

(5) According to a preferred aspect, the setting screen display function Fd allows other related items (Dm . . . , Dd) concerning the mold clamping side priority setting screen Vc to be displayed in the non-display area Vco. When, for example, the other setting items Dm . . . and a monitor item Dd on the mold clamping device Mc side are displayed, it is possible to contribute to a further improvement in usability and convenience of the mold clamping side priority setting screen Vc, and also an improvement in a management property as a whole. Specifically, a clamping force setting unit for setting the clamping force is displayed, so that the setting on the clamping force that has an influence on a parting opening amount Lm can be made appropriately and easily while referring to the other setting items Ds . . . (an injection pressure setting unit and the like). Further, by displaying an analog monitor display unit of the parting opening amount Lm obtained on a real-time basis, a changing state of the parting opening amount Lm with respect to time displayed in a graph data display unit and a real-time value (size) of the parting opening amount Lm displayed in the analog monitor display unit can be recognized at the same time, and the parting opening amount Lm can be monitored optimally due to a synergy effect therebetween.

(6) According to a preferred aspect, the setting screen display function Fd allows setting items Vx . . . of the injection side priority setting screen Vi that are not required in the mold clamping side priority setting screen Vc to be displayed in the mold clamping side priority setting screen Vc with a different display color and/or display concentration. This makes it possible to easily recognize difference and relationship of the setting items Ds . . . between the mold clamping side priority setting screen Vc and the injection side priority setting screen Vi, and to use them as reference information for selecting either of the screens Vi and Vc.

(7) According to a preferred aspect, the setting screen display function Fd allows a limit velocity setting unit Vcv for setting a limit velocity of the injection velocity in the mold clamping side priority setting screen Vc to be displayed at the corresponding position where an injection velocity setting unit Viv for setting the injection velocity is displayed in the injection side priority setting screen Vi. This makes it possible to easily recognize the position to set the injection velocity in the mold clamping side setting priority mode Ec and the injection side setting priority mode Ei, and to easily recognize positioning, influences and the like of the setting items Ds . . . between the two.

(8) According to a preferred aspect, the setting screen display function Fd allows a plasticization setting unit Vcm for setting a plasticizing condition of the resin in the mold clamping side priority setting screen Vc to be displayed at the corresponding position where a measurement setting unit Vim for setting a measuring condition of a resin amount to be injected is displayed in the injection side priority setting screen Vi. This makes it possible to easily recognize the position to set the plasticization and melting of the resin in the mold clamping side setting priority mode Ec and the injection side setting priority mode Ei, and to easily recognize the positioning, the influences and the like of the setting items Ds . . . between the two.

(9) According to a preferred aspect, the setting screen display function Fd allows the injection pressure setting unit Vcp for setting the injection pressure in the mold clamping side priority setting screen Vc to be displayed at the corresponding position where a limit pressure setting unit Vip for setting a limit pressure of the injection pressure is displayed in the injection side priority setting screen Vi. This makes it possible to easily recognize the position to set the injection pressure in the mold clamping side setting priority mode Ec and the injection side setting priority mode Ei, and to easily recognize the positioning, the influences and the like of the setting items Ds . . . between the two.

(10) According to a preferred aspect, the setting screen display function Fd displays a position axis as a horizontal axis of a graph data display unit Vig in the injection side priority setting screen Vi, and can display either a time axis or a position axis as selected as a horizontal axis of a graph data display unit Vcg in the mold clamping side priority setting screen Vc. As changes in property data with respect to time and position at the time of molding can be recognized while making a comparison therebetween, fine adjustments and the like to optimize the molding conditions can be performed easily, and change data of the parting opening amount Lm and the like are monitored more appropriately, and necessary data analyses and the like can be performed easily and closely.

(11) According to a preferred aspect, if the molding conditions, to which the priority is given by the injection side setting priority mode Ei, include at least one of the injection velocity to advance the screw 4 and the measuring condition regarding the resin amount to be injected, it is possible for the injection side setting priority mode Ei to function as the most popular molding system that has been in widespread use up to now.

(12) According to a preferred aspect, if the molding conditions, if the molding conditions, to which the priority is given by the mold clamping side setting priority mode Ec, include at least the predetermined clearance (parting opening amount) Lm generated between the movable mold 2m and the fixed mold 2c of the mold 2 when charging the resin, it is possible to generate the predetermined parting opening amount Lm by relative power relationship between the clamping force and the injection pressure at the time of molding. This makes it possible to cause natural compression by the clamping force after finishing the injection-charging of the resin, and also to secure high quality and homogeneity of the molded items. Consequently, the mold clamping side setting priority mode Ec is the best suited when used in molding low-viscosity resin that is highly susceptible to temperatures, pressures and the like.

BRIEF DESCRIPTION OF DRAWINGS

FIG. 8 is a data table showing the quality of molded items with respect to a clamping force, in order to explain processing according to the mold clamping side setting priority mode of the control device;

FIG. 9 is a view showing change characteristics of an injection pressure, an injection velocity, and a mold clearance with respect to time, according to the mold clamping side setting priority mode of the control device at the time of manufacturing;

DESCRIPTION OF EMBODIMENTS

Next, the best mode of the present invention will be explained in detail with reference to the drawings. It should be noted that the attached drawings are not for specifying the invention, but for facilitating understanding of this invention. With regard to known parts, detailed explanations are omitted to prevent ambiguity of the invention.

First, schematic structure of an injection molding machine M equipped with a control device 1 according to this embodiment will be explained with reference to FIG. 1 and FIG. 2.

Figure 2:
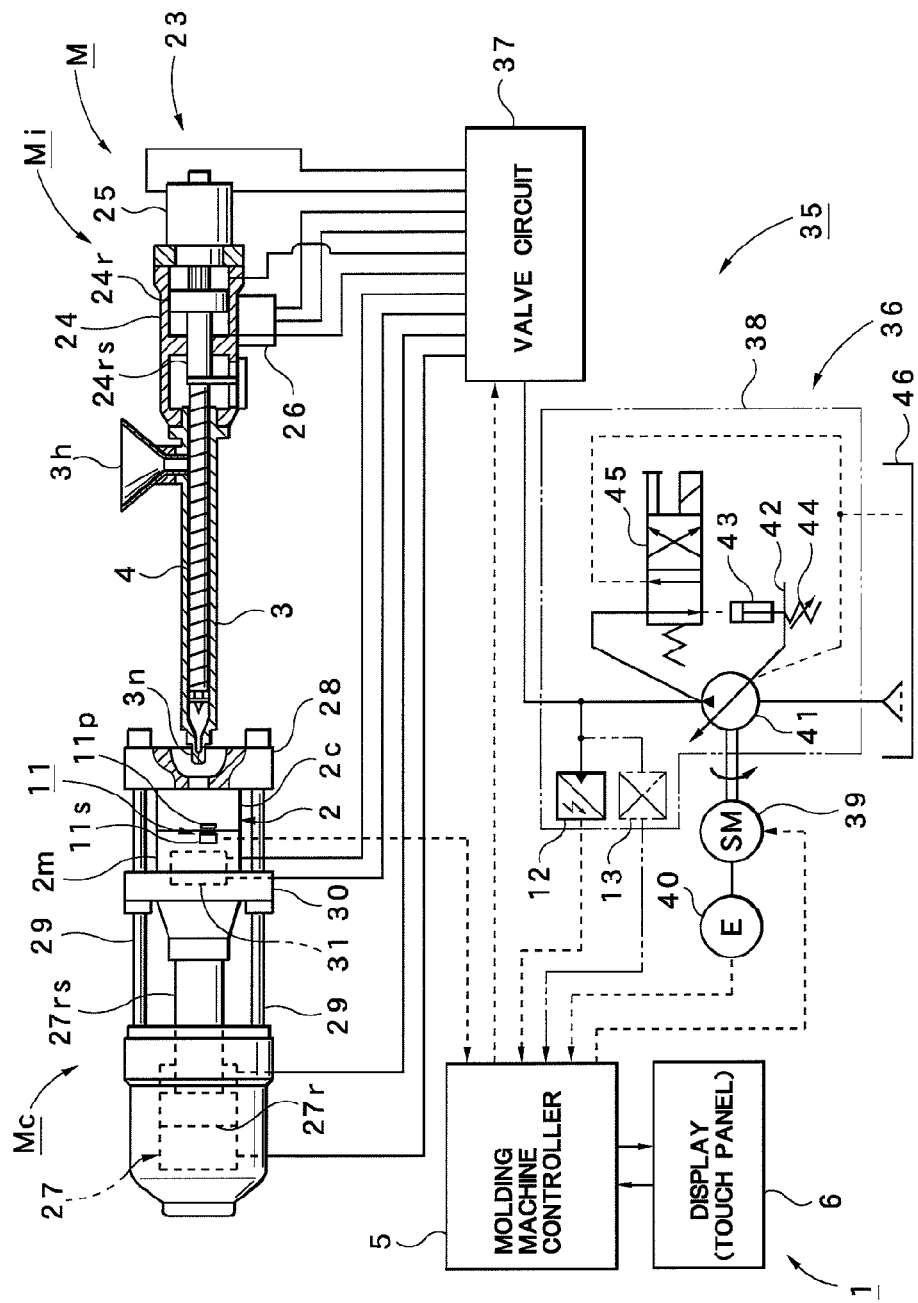
FIG. 2 is a block diagram of an injection molding machine on which the control device is mounted.
Figure 10:
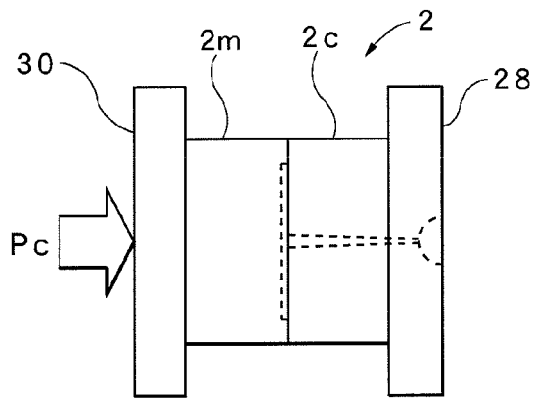
FIG. 10(a) is a schematic view showing the state of a mold according to the mold clamping side setting priority mode of the control device at the time of manufacturing.
FIG. 10(b) is a schematic view showing another state of the mold according to the mold clamping side setting priority mode of the control device at the time of manufacturing.
FIG. 10(c) is a schematic view showing another state of the mold according to the mold clamping side setting priority mode of the control device at the time of manufacturing.
Figure 10:
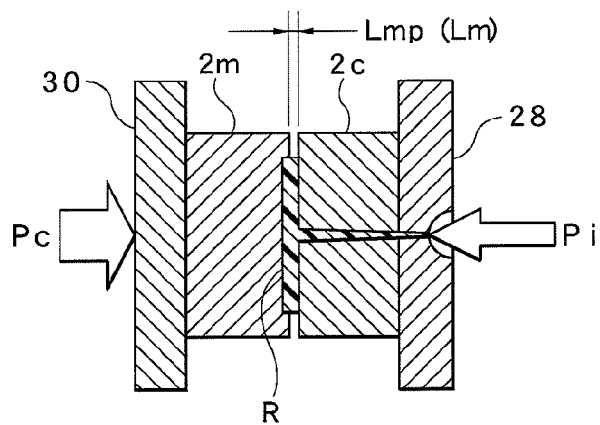
Figure 10:
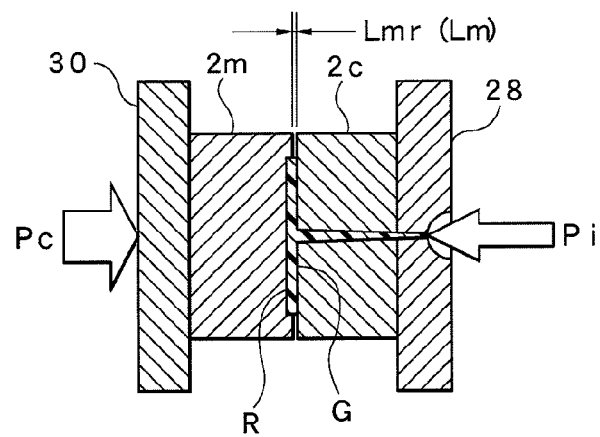

In FIG. 2, the injection molding machine M includes an injection device Mi and a mold clamping device Mc. The injection device Mi includes a heating cylinder 3 having an injection nozzle 3n at its front end and a hopper 3h at its rear. The heating cylinder 3 has a screw 4 inserted therein, and a screw driving unit 23 disposed at its rear end. The screw driving unit 23 includes an injection cylinder (hydraulic cylinder) 24 containing a single rod type injection ram 24r therein. A ram rod 24rs that projects toward the front of the injection cylinder 24 couples to the rear end of the screw 4. To the rear end of the injection ram 24r, a shaft of a measuring motor (oil motor) 25 that is attached to the injection cylinder 24 is spline-coupled. An injection device moving cylinder 26 allows the injection device Mi to move forward and backward so as to make its nozzle touch or separate from a mold 2. Thus, it is possible for the injection device Mi to allow the injection nozzle 3n to touch the mold 2 and to inject and charge molten (plasticized) resin R (FIG. 10(b)) into a cavity of the mold 2.

Meanwhile, the mold clamping device Mc includes a direct pressure type hydraulic mold clamping device that displaces a movable mold 2m by a drive ram 27r of a mold clamping cylinder (hydraulic cylinder) 27. Such a hydraulic mold clamping device used as the mold clamping device Mc is the best suited in the case where the movable mold 2m is displaced by an injection pressure at the time of injection and charging to generate a necessary clearance (parting opening amount) Lm (Lmp, Lmr). The mold clamping device Mc includes a movable platen 30 that is slidably provided to a plurality of tie bars 29 . . . disposed between a fixed platen 28 that is provided at a fixed position and spaced therefrom and the mold clamping cylinder 27. To this movable platen 30, the tip of a ram rod 27rs projecting forward from the mold clamping cylinder 27 is fixed. A fixed mold 2c is mounted on the fixed platen 28, and the movable mold 2m is mounted on the movable platen 30. The fixed mold 2c and the movable mold 2m form the mold 2. Thus, it is possible for the mold clamping cylinder 27 to open/close and clamp the mold 2. An ejecting cylinder 31 ejects a molded item G (FIG. 10(c)) that is attached to the movable mold 2m when the mold 2 is opened.

Meanwhile, a hydraulic circuit 35 includes a variable discharge type hydraulic pump 36 that serves as a hydraulic drive source, and a valve circuit 37. The hydraulic pump 36 includes a pump unit 38 and a servo motor 39 that rotatably drives the pump unit 38. A rotary encoder 40 detects a number of revolutions of the servo motor 39. The pump unit 38 contains therein a pump machine body 41 that is formed by a swash plate type piston pump. Therefore, the pump unit 38 includes a swash plate 42, and an increase in an inclination angle (swash plate angle) of the swash plate 42 increases a stroke of the pump piston in the pump machine body 41 and increases a discharge flow rate, and a reduction in the swash plate angle reduces the stroke of the pump piston and reduces the discharge flow rate. This means that, by setting the swash plate angle to a predetermined angle, it is possible to set a fixed discharge flow rate with which the discharge flow rate (maximum capacity) is fixed to a predetermined rate. A control cylinder 43 and a return spring 44 are attached to the swash plate 42, and the control cylinder 43 is connected to a discharge port of the pump unit 38 (pump machine body 41) via a switching valve (magnetic valve) 45. Thus, the angle of the swash plate 42 (swash plate angle) can be changed by controlling the control cylinder 43.

An inlet port of the pump unit 38 is connected to an oil tank 46, and the discharge port of the pump unit 38 is connected to an upstream side of the valve circuit 37. Further, a downstream side of the valve circuit 37 is connected to the injection cylinder 24, the measuring motor 25, the mold clamping cylinder 27, the ejecting cylinder 31, and the injection device moving cylinder 26 of the injection molding machine M. For this reason, the valve circuit 37 includes switching valves (magnetic valves) respectively connecting to the injection cylinder 24, the measuring motor 25, the mold clamping cylinder 27, the ejecting cylinder 31, and the injection device moving cylinder 26. Each of the switching valves is formed by one or more valve components, necessary hydraulic components as attachments and the like, and has, at least, the function of switching for supplying, stopping, and discharging of a hydraulic oil to the injection cylinder 24, the measuring motor 25, the mold clamping cylinder 27, the ejecting cylinder 31, and the injection device moving cylinder 26.

When the number of revolutions of the servo motor 39 is variably controlled, the discharge flow rate and a discharge pressure of the variable discharge type hydraulic pump 36 can be varied. Based on this, it is possible to perform drive control of the above-described injection cylinder 24, the measuring motor 25, the mold clamping cylinder 27, the ejecting cylinder 31, and the injection device moving cylinder 26, and to control each operation process in a molding cycle. Thus, when the variable discharge type hydraulic pump 36, capable of setting the fixed discharge flow rate by changing the swash plate angle, is used, it is possible to set the pump capacity to the fixed discharge flow rate (maximum capacity) of the predetermined rate, and to vary the discharge flow rate and the discharge pressure based on the fixed discharge flow rate. This allows a control system to perform control easily and smoothly.

Next, concrete structure of the control device 1 according to this embodiment will be explained with reference to FIG. 1 to FIG. 4.

The control device 1 includes a molding machine controller 5 and a display 6 attached to the molding machine controller 5. The molding machine controller 5 includes a controller body 51 and a servo amplifier 52 connected to the controller body 51, as shown in FIG. 1. An output unit of the servo amplifier 52 is connected to the above-described servo motor 39, and an encoder pulse input unit of the servo amplifier 52 is connected to the rotary encoder 40. Further, as shown in FIG. 2, a control signal output port of the molding machine controller 5 is connected to the above-described valve circuit 37. Meanwhile, a position transducer (clearance sensor) 11 is attached to an outer surface of the mold 2. The clearance sensor 11 has the function of detecting relative positions of the movable mold 2m and the fixed mold 2c, that is, the size of a parting opening amount Lm, and can be formed by, for example, a combination of a reflector plate 11p that is attached to the fixed mold 2c (or the movable mold 2m), and a reflection type distance measuring sensor 11s that is attached to the movable mold 2m (or the fixed mold 2c) and projects light or a radio wave to the reflector plate 11p so as to measure distance, as shown in FIG. 2. It is desirable to dispose the clearance sensor 11 near a horizontal center when it is provided on the upper surface of the mold 2, and near a vertical center when it is provided on the side surface of the mold 2. The advantage of using such a clearance sensor 11 is that an accurate parting opening amount Lm, with minimized error factors as much as possible except for the clearance sensor 11, and its change data can be obtained, because the size of the parting opening amount Lm can be detected directly. Further, a pressure sensor 12 for detecting an oil pressure, and a temperature sensor 13 for detecting an oil temperature are attached to an upstream side of the valve circuit 37 in the hydraulic circuit 35. The clearance sensor 11, the pressure sensor 12, and the temperature sensor 13 are connected to sensor ports of the molding machine controller 5.

Meanwhile, the display 6 includes a display body 6d and a touch panel 6t attached to the display body 6d. The display body 6d and the touch panel 6t are connected to the controller body 51 via a display interface 53. Therefore, various setting operations, selecting operations and the like can be made using the touch panel 6t.

Figure 1:
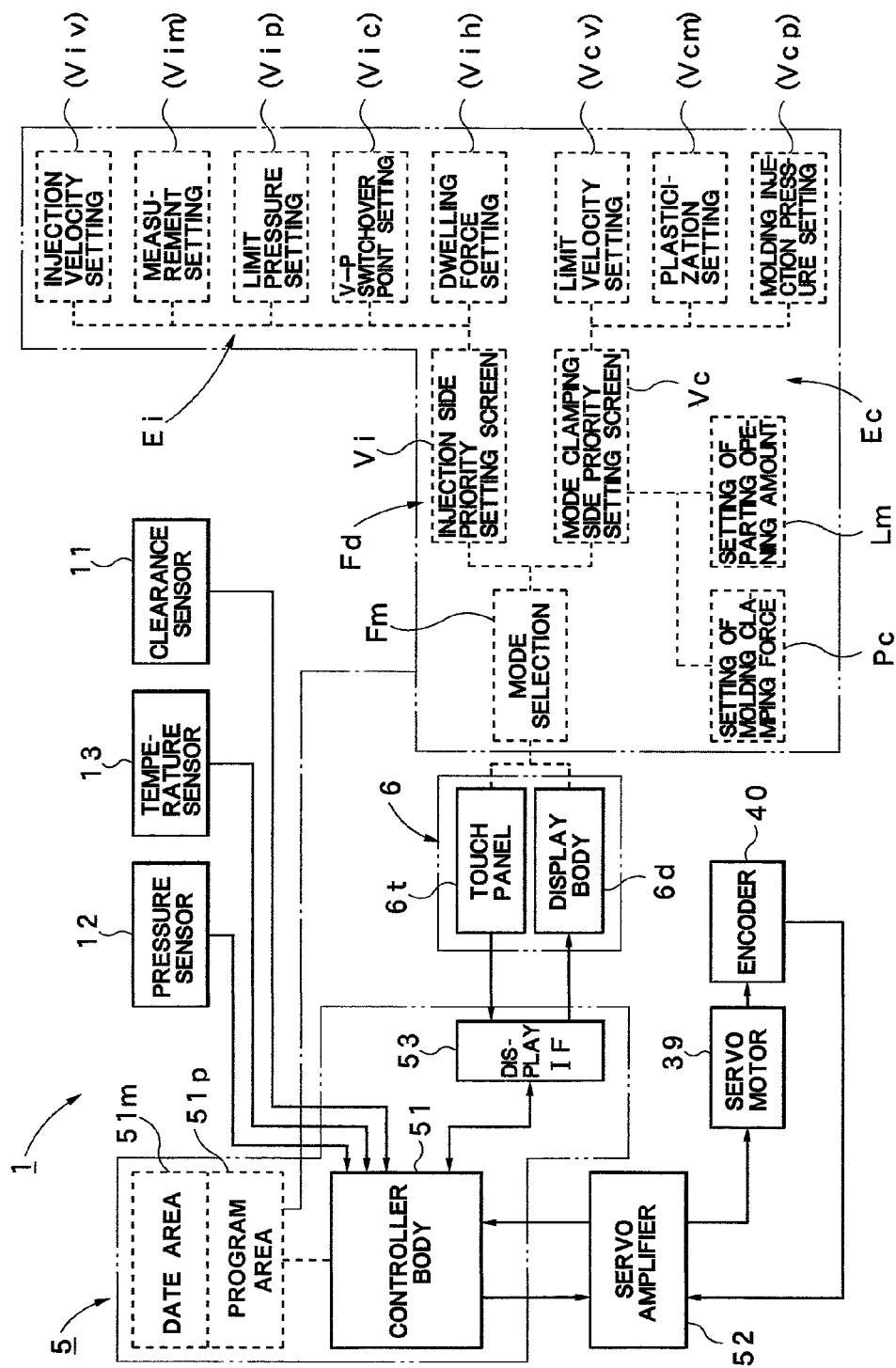
FIG. 1 is a functional block diagram showing an essential part of a control device according to the best mode of this invention.

FIG. 1 is a functional block diagram showing the entire control device 1 according to this embodiment. The controller body 51 has a computer function and contains therein hardware such as a CPU, internal memory and the like. Thus, the internal memory has a data area 51m in which various data can be stored, and a program area 51p in which control programs (software) for executing various arithmetic processing and control processing (sequence control) are stored. Particularly, the control programs include the control programs allowing the control device 1 according to this embodiment to function, that is, the control programs capable of performing molding in two modes: an injection side setting priority mode Ei, and a mold clamping side setting priority mode Ec, respectively. It also includes the control program having a mode selecting function Fm that selects from two modes of Ei and Ec, and a setting screen display function Fd that displays on the display 6 an injection side priority setting screen Vi corresponding to the injection side setting priority mode Ei when the injection side setting priority mode Ei is selected, and displays on the display 6 a mold clamping side priority setting screen Vc corresponding to the mold clamping side setting priority mode Ec when the mold clamping side setting priority mode Ec is selected.

Figure 3:
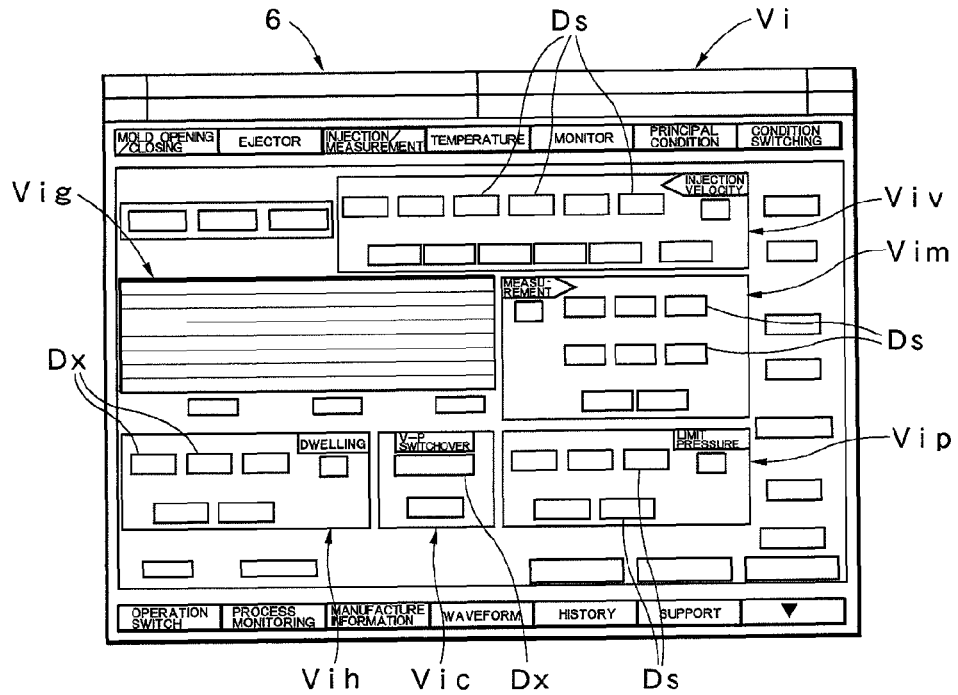
FIG. 3 is a view showing a display of an injection side priority setting screen displayed by the control device.

In this case, the injection side setting priority mode Ei is the mode for injecting and charging the resin R by giving priority to molding conditions set on the injection device Mi side, with which the molding can be performed by the common (general-purpose) molding system in a manner. The injection side priority setting screen Vi is displayed on the display 6 as shown in FIG. 3. The injection side priority setting screen Vi includes an injection velocity setting unit Viv for setting an injection velocity, a measurement setting unit Vim for setting a screw position and the like as measuring conditions of a resin amount to be injected, a limit pressure setting unit Vip for setting a limit pressure of the injection pressure, a V-P switchover setting unit Vic for setting a V-P switchover point as a point to switch from velocity control to pressure control, and a dwelling force setting unit Vih for setting a dwelling force. According to the injection side setting priority mode Ei, therefore, the mold clamping device Mc is in a non-control state to be at rest, and the injection device Mi is in a dynamically-controlled state to inject and charge the resin R, in a manner. If the molding conditions, to which the priority is given by the injection side setting priority mode Ei, include at least one of the injection velocity to advance the screw 4 and the measuring condition regarding to the resin amount to be injected, it is possible for the injection side setting priority mode Ei to function as the most popular molding system that has been in widespread use conventionally.

Figure 4:
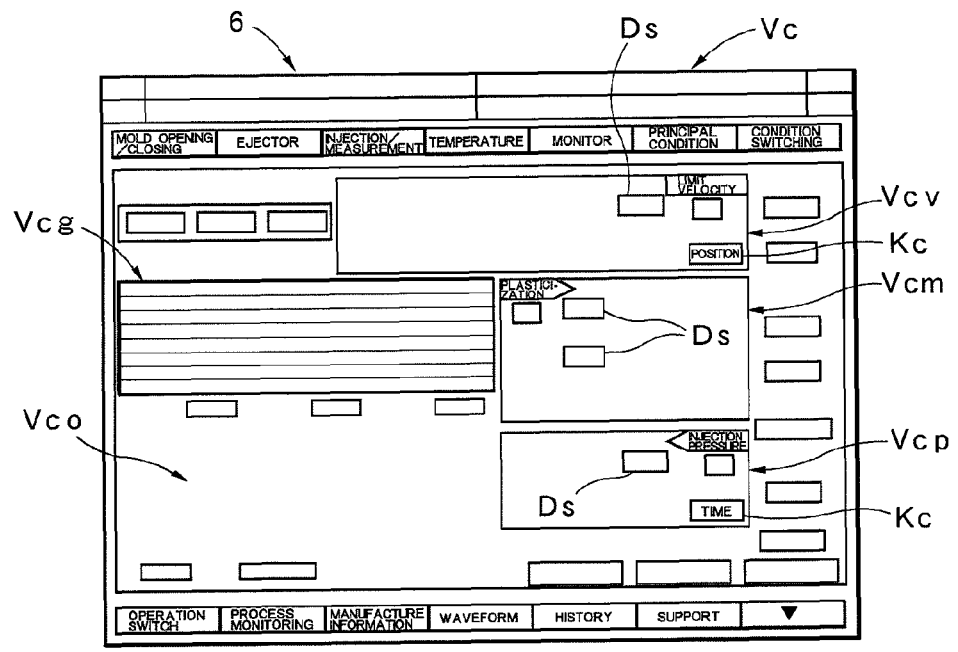
FIG. 4 is a view showing a display of a mold clamping side priority setting screen displayed by the control device.

On the other hand, the mold clamping side setting priority mode Ec is the mode for injecting and charging the resin R by giving priority to molding conditions set on the mold clamping device Mc side, with which the molding can be performed by a new molding system proposed in this embodiment. The mold clamping side priority setting screen Vc is displayed on the display 6 as shown in FIG. 4. The mold clamping side priority setting screen Vc includes a limit velocity setting unit Vcv for setting a limit velocity of the injection velocity, a plasticization setting unit Vcm for setting plasticizing conditions of the resin R, and an injection pressure setting unit Vcp for setting the injection pressure. In this case, the injection pressure serves as a later-described molding injection pressure that is determined based on a rated value, and is substantially set as a limit pressure. In the illustration, it is possible to use another screen to set the parting opening amount Lm that is a predetermined clearance generated between the movable mold 2m and the fixed mold 2c of the mold 2 at the time of charging the resin R. The mold clamping side setting priority mode Ec places importance to this parting opening amount Lm and the priority is given thereto at the time of setting. A clamping force (molding clamping force) Pc and an injection pressure (molding injection pressure) Pi, by which this parting opening amount Lm can be obtained, are set assuming that non-defective items can be molded. Therefore, according to the mold clamping side setting priority mode Ec, the mold clamping device Mc is in a control state to obtain the parting opening amount Lm, and the injection device Mi is in a non-control state to perform simple injection, in a manner. If the molding conditions, to which the priority is given by the mold clamping side setting priority mode Ec, include at least the parting opening amount Lm, it is possible to generate the predetermined parting opening amount Lm by relative power relationship between the clamping force and the injection pressure at the time of molding. This makes it possible to cause natural compression by the clamping force after finishing the injection and charging of the resin, and also to secure high quality and homogeneity of the molded items. Consequently, the mold clamping side setting priority mode Ec is the best suited when used in molding low-viscosity resin that is highly susceptible to temperatures, pressures and the like.

Meanwhile, according to this embodiment, the setting screen display function Fd allows the injection side priority setting screen Vi and the mold clamping side priority setting screen Vc to display a part of or the entire setting units Viv . . . regarding the identical setting targets at the identical positions, respectively, as shown in FIG. 3 and FIG. 4. Specifically, the limit velocity setting unit Vcv for setting the limit velocity of the injection velocity in the mold clamping side priority setting screen Vc is displayed at the corresponding position where the injection velocity setting unit Viv for setting the injection velocity is displayed in the injection side priority setting screen Vi. In this case, the setting target is the velocity of the screw 4 in both cases. This makes it possible to easily recognize the position to set the injection velocity in the mold clamping side setting priority mode Ec and the injection side setting priority mode Ei, and to easily recognize positioning, influences and the like of the setting items Ds . . . between the two. Further, the plasticization setting unit Vcm for setting the plasticizing conditions of the resin in the mold clamping side priority setting screen Vc is displayed at the corresponding position where the measurement setting unit Vim for setting the measuring conditions of the resin amount to be injected is displayed in the injection side priority setting screen Vi. In this case, the setting target is the plasticization of the resin R in both cases. This makes it possible to easily recognize the position to set the plasticization and melting of the resin in the mold clamping side setting priority mode Ec and the injection side setting priority mode Ei, and to easily recognize the positioning, the influences and the like of the setting items Ds . . . between the two. Furthermore, the injection pressure setting unit Vcp for setting the injection pressure in the mold clamping side priority setting screen Vc is displayed at the corresponding position where the limit pressure setting unit Vip for setting the limit pressure of the injection pressure is displayed in the injection side priority setting screen Vi. In this case, the setting target is the injection pressure in both cases. This makes it possible to easily recognize the position to set the injection pressure in the mold clamping side setting priority mode Ec and the injection side setting priority mode Ei, and to easily recognize the positioning, the influences and the like of the setting items Ds . . . between the two. Thus, as the setting screen display function Fd allows the injection side priority setting screen Vi and the mold clamping side priority setting screen Vc to display a part of or the entire setting units Viv . . . regarding the identical setting targets at the identical positions, respectively, it is possible to improve usability when switching between the mold clamping side priority setting screen Vc and the injection side priority setting screen Vi.

In addition, the setting screen display function Fd allows the setting units Vic . . . of the injection side priority setting screen Vi, which are not required in the mold clamping side priority setting screen Vc, to be not settable in the mold clamping side priority setting screen Vc, as shown in FIG. 3 and FIG. 4. In the illustration, the dwelling force setting unit Vih for setting the dwelling force and the V-P switchover setting unit Vic for setting the V-P switchover point in the injection side priority setting screen Vi are not required in the mold clamping side priority setting screen Vc, and therefore, these two setting units Vih and Vic are not displayed in the mold clamping side priority setting screen Vc. A non-display area Vco is provided in the mold clamping side priority setting screen Vc, where the setting cannot be made. This makes it possible to prevent unnecessary confusion and setting errors at the time of setting, and to further improve the convenience of the user. When the setting units Vic . . . of the injection side priority setting screen Vi, not required in the mold clamping side priority setting screen Vc, are not displayed in the mold clamping side priority setting screen Vc, and the non-display area Vco is provided in the mold clamping side priority setting screen Vc, as described above, the unnecessary setting items Dx . . . are not displayed in the mold clamping side priority setting screen Vc, and the simplest display is realized. This contributes to an improvement in setting easiness including visibility, operability, and the like.

Moreover, the setting screen display function Fd has the function capable of displaying a position axis as a horizontal axis of a graph data display unit Vig in the injection side priority setting screen Vi, and of displaying either a time axis or a position axis selected as a horizontal axis of a graph data display unit Vcg in the mold clamping side priority setting screen Vc. In the mold clamping side priority setting screen Vc, therefore, selection keys Kc . . . are displayed in order to select either the time axis or the position axis, as shown in FIG. 4. In the illustration, the selection keys Kc . . . are provided in the respective setting units Vck, Vcp . . . and it is possible to select either the time axis or the position axis for each of the setting units Vck, Vcp . . . As changes in property data with respect to time and position at the time of molding can be recognized while making a comparison therebetween, there are advantages that fine adjustments and the like to optimize the molding conditions can be performed easily, and change data of the parting opening amount Lm and the like are monitored more appropriately, so as to perform necessary data analyses and the like easily and closely.

Figure 5:
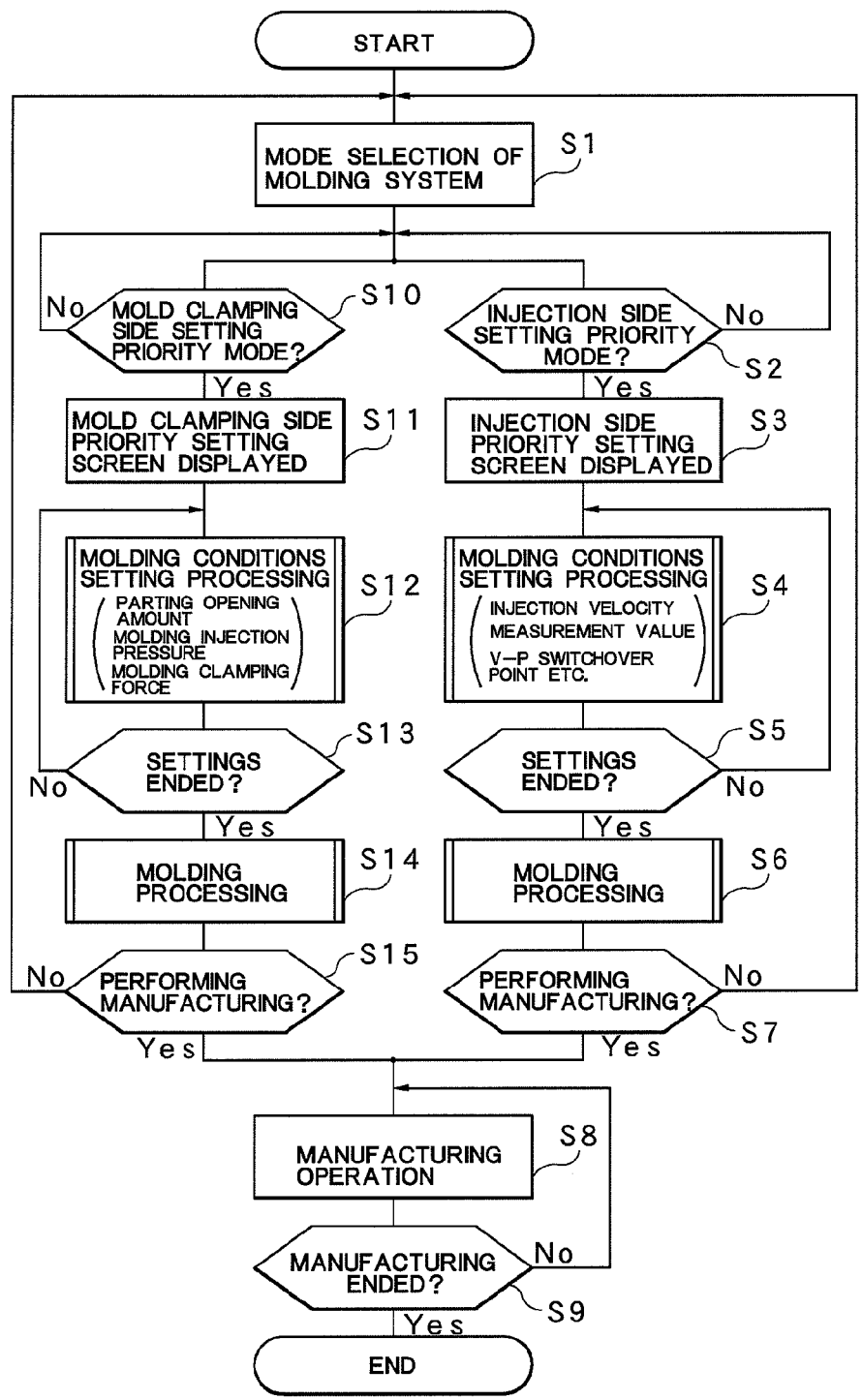
FIG. 5 is a flowchart for explaining operation outlines of the injection molding machine on which the control device is mounted.

Next, an operation of the control device 1 according to this embodiment will be explained step by step based on a flowchart shown in FIG. 5 (FIG. 6 and FIG. 7) with reference to FIG. 1 to FIG. 4 and FIG. 8 to FIGS. 10(a), (b) and (c).

First, the mode of the molding system is selected. In other words, either the mold clamping side setting priority mode Ec or the injection side setting priority mode Ei is selected for performing the molding (step S1). In this case, it is assumed that the user selects, for example, the injection side setting priority mode Ei that is the common molding system and is relatively familiar the user (step S2). Thereby, the injection side priority setting screen Vi as shown in FIG. 3 is displayed on the display 6 (step S3). Thus, the settings of the various molding conditions can be made by the user using the injection side priority setting screen Vi (step S4). Specifically, it is possible to make the setting of the injection velocity by using the injection velocity setting unit Viv (plural stages in general), the setting of the measuring conditions by using the measurement setting unit Vim (back pressure, screw position, and the like), the setting of the limit pressure of the injection pressure by using the limit pressure setting unit Vip (plural stages in general), the setting of the V-P switchover point by using the V-P switchover setting unit Vic (screw position in general), the setting of the dwelling force by using the dwelling force setting unit Vih, and the like. When the settings are completed, molding processing (trial molding) is performed (steps S5 and S6).

Figure 6:
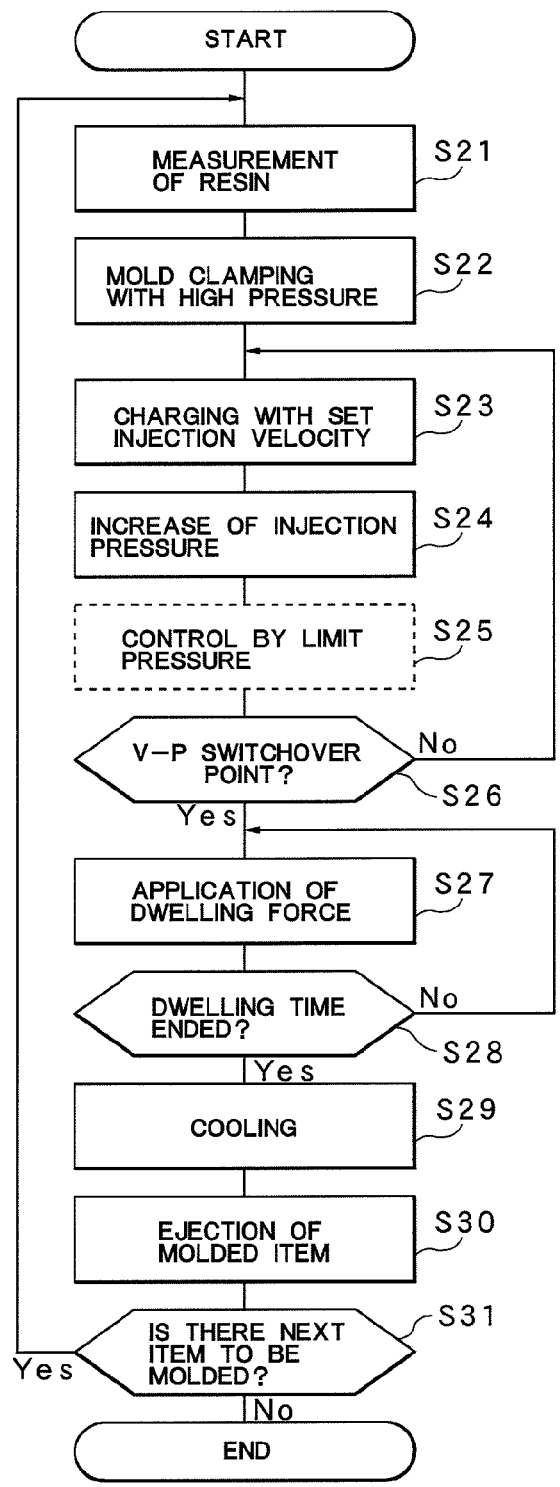
FIG. 6 is a flowchart for explaining processing procedures according to an injection side setting priority mode of the control device at the time of manufacturing.

FIG. 6 shows molding processing procedures using the injection side setting priority mode Ei. At the time of molding, the injection device Mi allows the screw 4 to rotate to plasticize and melt the resin R and to retreat to a preset measuring position (step S21). Further, the mold clamping device Mc clamps the mold 2 (step S22). At this time, the mold is clamped with high pressure so as to prevent the mold 2 from opening at the time of injection and charging. Next, the screw 4 is allowed to advance at the set injection velocity, and the measured resin R is injected and charged into the cavity of the mold 2 (step S23). Here, the velocity control is performed. The injection pressure increases by the injection and charging and, if the injection pressure reaches the limit pressure, the injection pressure is limited to the limit pressure (steps S24 and S25). When the screw 4 reaches the V-P switchover point (V-P switchover position or the like), switching from the velocity control to the pressure control is made, and the dwelling force is applied to the resin R charged in the mold 2 (steps S26 and S27). After the elapse of the set dwelling time, it is cooled by a set cooling time (steps S28 and S29). After the elapse of the cooling time, the mold is opened and the molded item is ejected by ejecting an ejector pin by the ejecting cylinder 31 (step S30). The above molding processing is repeated until a non-defective item is molded, for example, by making fine adjustments and the like (step S31, S21 . . . ). When this results in the molding in an excellent manner, a shift to manufacturing operations can be made without any change (steps S7, S8 and S9).

Meanwhile, assumption is made about the case in which, as a result of the molding processing using the injection side setting priority mode Ei, sink mark defects and the like are caused, that is, the case of failing to perform the molding in an excellent manner. In this case, the user can try the molding processing according to the other mode or the mold clamping side setting priority mode Ec, and the mold clamping side setting priority mode Ec is selected in the above-described mode selection (steps S1 and S10). The mold clamping side setting priority mode Ec is the new molding system proposed in this embodiment. By selecting the mold clamping side setting priority mode Ec, the mold clamping side priority setting screen Vc as shown in FIG. 4 is displayed on the display 6 (step S11). Thus, the settings on the molding conditions can be made by the user using the mold clamping side priority setting screen Vc (step S12).

Hereinafter, a setting method of the molding conditions will be explained specifically. First, the molding clamping force Pc and the molding injection pressure Pi that are used in manufacturing are obtained and set as the molding conditions. At this time, the following conditions need to be satisfied:

(x) an appropriate parting opening amount (natural clearance) Lm is generated between the fixed mold 2c and the movable mold 2m at the time of injection and charging; and (y) molding failures including fins, sink marks, warpage and the like are not generated in the molded items.

Regarding to the natural clearance Lm, it is necessary to satisfy the following permissible ranges of a molding clearance Lmp as a maximum parting opening amount and a remaining clearance Lmr as a parting opening amount after the elapse of the cooling time Tc, in consideration of degassing and compression (natural compression) of the resin R:

(xa) the molding clearance Lmp of 0.03 to 0.30 mm; and (xb) the remaining clearance Lmr of 0.01 to 0.10 mm.

Moreover, at the time of manufacturing, the injection of the resin R is simply made according to the molding conditions that the mold is clamped by the set molding clamping force Pc and that the molding injection pressure Pi is set to the limit pressure.

According to such a molding system, the natural clearance Lm and the natural compression are caused in the mold 2 at the time of injection-charging. As a result of this, even when the screw position of the injection device Mi is unstable at the time of injection and charging, the mold clamping device Mc adapts to the unstable screw position, so that the stable molded items can be obtained.

Hereinafter, specific processing procedures will be explained. First, the molding injection pressure Pi and the molding clamping force Pc to be the molding conditions are obtained in advance and set as the molding conditions. At this time of setting the molding conditions, another setting screen is displayed in the window. First, the injection pressure as the injection conditions on the injection device Mi side is initialized by the injection pressure setting unit 72. At this time, the injection pressure based on capacity of the injection device Mi (driving force) can be set as the injection pressure. In this case, the injection pressure can be obtained from the oil pressure Po detected by the pressure sensor 12 in the hydraulic circuit 35 connected to the injection cylinder 24. As the accurate injection pressure as an absolute value is not necessarily obtained, the oil pressure Po may be used as detected, or may be converted to the injection pressure by computation for use. Further, the clamping force as the mold clamping conditions on the mold clamping device Mc side is initialized by the clamping force setting unit. At this time, the clamping force based on capacity of the mold clamping device Mc (driving force) can be set as the clamping force. In this case, the clamping force can be obtained from the oil pressure Po detected by the pressure sensor 12 in the hydraulic circuit 35 connected to the mold clamping cylinder 27. As the accurate clamping force as an absolute value is not necessarily obtained, the oil pressure Po may be used as detected, or may be converted to the clamping force by computation for use. It should be noted that the hydraulic circuit 35 is switched by the valve circuit 37 to function as the hydraulic circuit on the mold clamping device Mc side at the time of mold clamping, and function as the hydraulic circuit on the injection device Mi side at the time of injection. When such an oil pressure Po is used as the injection pressure and the clamping force, the settings on the molding clamping force Pc and the molding injection pressure Pi can be made easily. In addition, as the accurate settings of the molding clamping force Pc and the molding injection pressure Pi as the absolute values are not necessary, it is possible to perform the operation control with less error factors and with higher accuracy.

Next, the initialized clamping force is subjected to optimization processing to obtain the molding clamping force Pc to be used at the time of manufacturing, and the initialized injection pressure is subjected to optimization processing to obtain the molding injection pressure Pi to be used at the time of manufacturing. An example of optimization methods of the clamping force and the injection pressure will be explained with reference to FIG. 8. In the illustration, the initialized clamping force is 40 kN. According to the results of the trial molding using the initialized clamping force and injection pressure, both of the molding clearance Lmp and the remaining clearance Lmr become zero as shown in FIG. 8. That is, the large clamping force results in no fins (very good), but poor sink marks, warpage, degassing (relatively poor, poor).

Then, the size of the clamping force and the size of the injection pressure are reduced step by step and the trial molding is performed at each step, as shown in FIG. 8, so as to measure the parting opening amounts Lm (Lmp, Lmr) between the fixed mold 2c and the movable mold 2m, and to examine the quality of the molded items. The results are shown in FIG. 8. In FIG. 8, no data is shown about the injection pressure. With regard to the optimization of the injection pressure, a settable minimum value or its close value can be set as the molding injection pressure Pi, on conditions that the parting opening amount Lm is generated between the movable mold 2m and the fixed mold 2c at the time of injection and charging, and that the non-defective items can be molded. Specifically, the size of the molding injection pressure Pi may be selected to be just before the size with which the normal charging of the resin R to the mold 2 becomes hard to accomplish, as a result of changing (reducing) the clamping force and changing (reducing) the injection pressure as needed. When such a minimum value or its close value is selected as the molding injection pressure Pi, the molding clamping force Pc can also be set to be the minimum value or its close value accordingly. This makes it possible to obtain optimal performance from the viewpoint of improving energy saving, to protect machinery components and the like, and to attain a long life. The obtained molding injection pressure Pi is set as a limiter pressure for the injection pressure at the time of manufacturing.

Meanwhile, in the respective steps in FIG. 8, when the clamping force is 14, 15 and 16 kN as in a virtual frame Zu, both of the molding clearance Lmp and the remaining clearance Lmr are in the permissible ranges. That is, the permissible range of the molding clearance Lmp of 0.03 to 0.30 mm, and also the permissible range of 0.03 to 0.20 mm are satisfied. Further, the permissible range of the remaining clearance Lmr of 0.01 to 0.10 mm, and also the permissible range of 0.01 to 0.04 mm are satisfied. Furthermore, none of the fins, the sink marks and the warpage is generated (very good), and the degassing is performed excellently (very good), thus satisfying the conditions to obtain the non-defective molded items. Consequently, the molding clamping force Pc can be selected from the three clamping forces, 14, 15 and 16 kN for setting. The selected clamping force is set as the molding clamping force Pc at the time of the mold clamping in manufacturing.

In FIG. 8, the best molded items without the generation of the fins can be obtained when the molding clearance Lmp satisfies the permissible range of 0.03 to 0.20 mm, and the remaining clearance Lmr satisfies the permissible range of 0.01 to 0.04 mm. However, as the fins can be removed after the molded items are taken out, and the molded items with a small amount of fins may be used as the non-defective items, the generation of the small amount of fins, shown as (good) and (fair) in FIG. 8, does not immediately mean that the items are defective. In this case, (good) means the small amount of fins is to the relatively small extent, and (fair) means the small amount of fins is to the relatively large extent. Consequently, when the results shown in FIG. 8 are taken into consideration, the clamping forces of 12 and 13 kN in a virtual frame Zus can also be selected, depending on the type and the like of the molded items G. In other words, it is possible to obtain the non-defective molded items when the molding clearance Lmp satisfies the permissible range of 0.03 to 0.30 mm, and the remaining clearance Lmr satisfies the permissible range of 0.01 to 0.10 mm.

FIG. 8 shows experimental data for explaining the setting methods of the molding clamping force Pc and the molding injection pressure Pi. Therefore, at the time of actual setting, the target molding clamping force Pc and molding injection pressure Pi can be obtained by changing the clamping force about several times, for example, 40, 30, 20, 10 and the like. The sizes of the clamping force and the injection pressure may be set by an operator at will, or may be obtained automatically or semi-automatically by using an auto-tuning function and the like of the molding machine M in combination. When the auto-tuning function is used, it is possible to easily obtain the clamping force just before the fins are generated.

Meanwhile, a limiter velocity for the injection velocity of the injection device Mi is set. Although the setting of this limiter velocity is not necessarily required, the set limiter velocity can protect the mold 2, the screw 4 and the like mechanically even when the injection velocity increases too much. Therefore, the limiter velocity is set to have such a size to be able to mechanically protect the mold 2, the screw 4 and the like. In addition, settings on other necessary information are made. The injection molding machine M as illustrated has a correcting function to correct the molding clamping force Pc according to the size of the oil temperature To detected by the temperature sensor 13 in the hydraulic circuit 35. This correcting function is the function to eliminate an influence of the oil temperature To exerted on the molding clamping force Pc due to a temperature drift and the like. As the molding clamping force Pc can be maintained constantly at all times, it is possible to further improve accuracy and stability of the operation control, and also to contribute to improving the quality and the homogeneity of the molded items. A correction coefficient that is used when the correction is made by the correcting function and the like may be applied in setting other necessary information. When these settings are completed, the molding processing (trial molding) is performed (steps S13 and S14).

Figure 7:
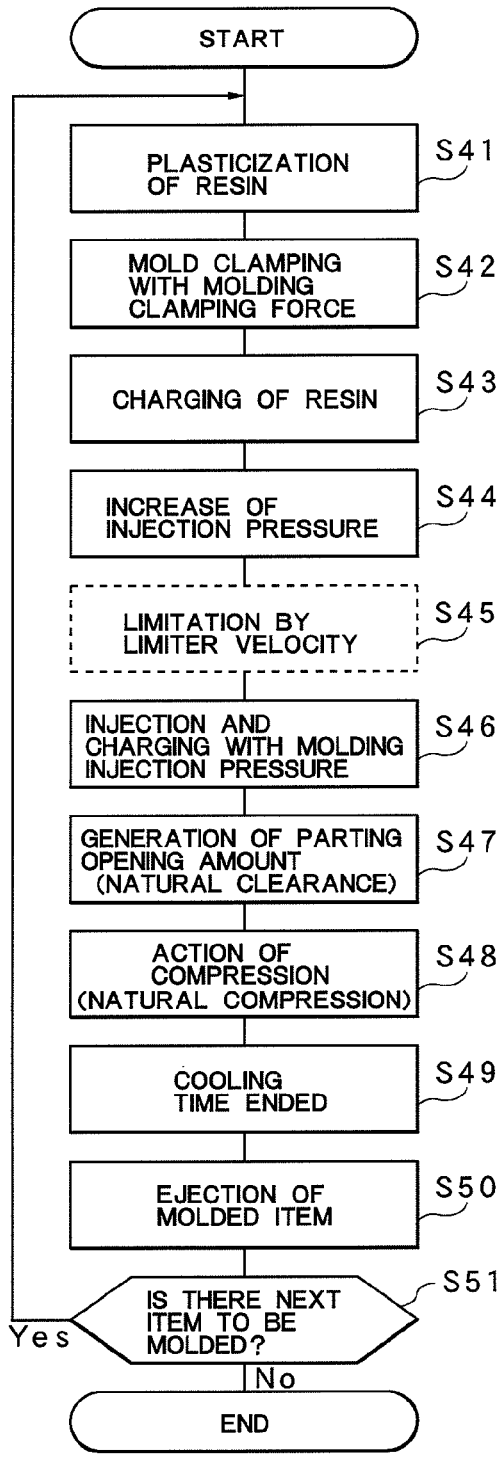
FIG. 7 is a flowchart for explaining processing procedures according to a clamping side setting priority mode of the control device at the time of manufacturing.

FIG. 7 shows molding processing procedures using the mold clamping side setting priority mode Ec. First, the valve circuit 37 is switched and the servo motor 39 is controlled to drive the measuring motor 25 of the injection device Mi so that the resin R is subjected to plasticizing processing (step S41). According to this molding system, the measuring step to accurately measure the resin R is not necessary, contrary to the injection side setting priority mode Ei. Namely, a measuring operation is performed in the common measuring step, but measuring control to obtain an accurate measurement value is not performed. In other words, an operation to add the resin R is performed before the resin R becomes insufficient. Further, the valve circuit 37 is switched and the servo motor 39 is controlled to drive the mold clamping cylinder 27 of the mold clamping device Mc so that the mold 2 is clamped with the molding clamping force Pc (step S42). The state of the mold 2 at this time is shown in FIG. 10(a).

Next, the valve circuit 37 is switched and the servo motor 39 is controlled to drive the injection cylinder 24 of the injection device Mi so that the resin R is injected and charged from an injection start point is shown in FIG. 9 (step S43). In this case, the screw 4 may be advanced according to a rated operation, and velocity control of the screw 4 is not necessary. Thereby, the plasticized and molten resin R inside the heating cylinder 3 is charged into the cavity of the mold 2. As the resin R is charged, an injection pressure Pd increases as shown in FIG. 9 (step S44). When an injection velocity Vd reaches a limiter velocity VL by any chance, the injection velocity Vd is limited to the limiter velocity VL (step S45). When the injection pressure Pd approaches and reaches a limit pressure Ps, control to keep the limit pressure Ps, that is, control to prevent an overshoot is performed, so that the injection pressure Pd is maintained at the limit pressure Ps (molding injection pressure Pi) (step S46). Thus, the control at a substantially single-stage pressure is performed in an injecting operation.

When the resin R is filled inside the cavity of the mold 2, the mold 2 is pressurized to the resin R, so that the mold clearance Lm is generated between the fixed mold 2c and the movable mold 2m, and the molding clearance Lmp is generated at the maximum (step S47). This molding clearance Lmp is within the permissible range of 0.03 to 0.30 mm, and more preferably, within the permissible range of 0.03 to 0.20 mm, by the preset molding clamping force Pc and the molding injection pressure Pi, so that the degassing is performed in an excellent manner and the non-defective items are molded. The state of the mold 2 at this time is shown in FIG. 10(b). Meanwhile, the resin R inside the cavity of the mold 2 cures as time advances, and the compression (natural compression) of the resin R is caused accompanying the cure (step S48).

After the elapse of the set cooling time Tc, the valve circuit 37 is switched and the servo motor 39 is controlled to drive the mold clamping cylinder 27 so that the movable mold 2m is retreated and the mold is opened. Then the valve circuit 37 is switched and the servo motor 39 is controlled to drive the ejecting cylinder 31 to eject the molded item G attached to the movable mold 2m (steps S49 and S50). Thus, the molded item G is taken out and one molding cycle is completed. It should be noted that the cooling time can be set in advance as an elapsed time from the injection start point ts. Further, at a time to after the elapse of the cooling time as shown in FIG. 9, the natural compression of the resin R allows the remaining clearance Lmr between the fixed mold 2c and the movable mold 2m to be within the permissible range of 0.01 to 0.10 mm, and more preferably, within the permissible range of 0.01 to 0.04 mm, due to the preset molding clamping force Pc and the molding injection pressure Pi. Thus, the natural compression of the resin R in the cavity of the mold 2 is caused without fail, and the high quality and homogeneity for the molded item G can be secured. The state of the mold 2 at this time is shown in FIG. 10(c). The above-described molding processing is repeated with fine adjustments and the like until, for example, a non-defective item is molded (steps S51, S41 . . . ). When the above-described molding processing results in the molding in an excellent manner, a shift to the manufacturing operations can be made without any change (steps S15, S8 and S9).

When the molding system according to the mold clamping side setting priority mode Ec is thus selected, the settings on the various molding conditions are not required, the conditions including the injection conditions such as the injection velocity, the V-P switchover point, the dwelling force and the like that influence each other and require accuracy, and also the measuring conditions such as the screw position and the like that require accurate measurement. This makes it possible to simplify and facilitate the settings of the molding conditions, facilitate the quality control, and also facilitate the operation control at the time of manufacturing. Further, a series of control operations, including the multi-stage control of the injection velocity, the control of the dwelling force and the like, are not required, so that a molding cycle time can be shortened and mass productivity and economic efficiency can be improved.

The control device 1 according to this embodiment includes the mode selecting function Fm for selecting either the injection side setting priority mode Ei that injects and charges the resin by giving priority to the molding conditions set for the injection device Mi, or the mold clamping side setting priority mode Ec that injects and charges the resin by giving priority to the molding conditions set for the mold clamping device Mc, and the setting screen display function Fd for displaying on the display 6 the injection side priority setting screen Vi corresponding to the injection side setting priority mode Ei when the injection side setting priority mode Ei is selected, and displaying on the display 6 the mold clamping side priority setting screen Vc corresponding to the mold clamping side setting priority mode Ec when the mold clamping side setting priority mode Ec is selected. Thus, when performing the molding, the user can select from the modes of the two different molding systems for the various molded items with different forms and materials. This results in an improvement in variety and flexibility of the molding processing, optimization of the molding processing by selecting the different molding systems, an improvement in the quality of the molded items, and also an improvement in added values and marketability of the injection molding machine.

Next, a modified example of the mold clamping side priority setting screen Vc that is displayed by the control device 1 according to this embodiment will be explained with reference to FIG. 11 and FIG. 12.

Figure 11:
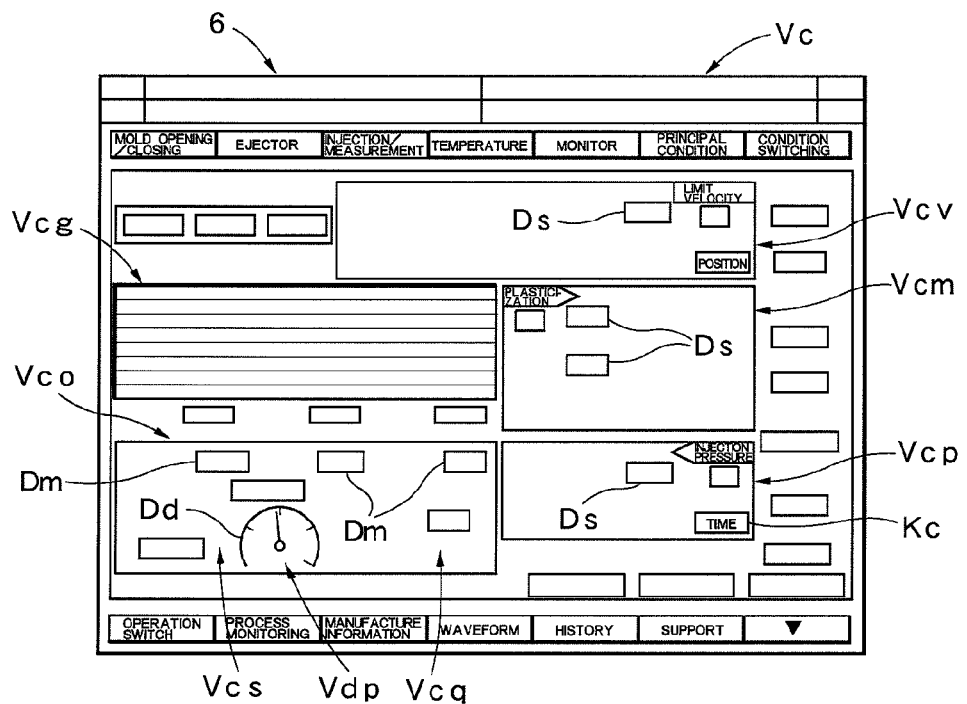
FIG. 11 is a view showing a display of the mold clamping side priority setting screen displayed by the control device, according to a modified example.

In FIG. 11, the setting screen display function Fd allows other related items (Dm Dd) concerning the mold clamping side priority setting screen Vc to be displayed in the non-display area Vco (FIG. 4). Thus, it is possible to contribute to a further improvement in usability and convenience of the mold clamping side priority setting screen Vc, and also an improvement in a management property as a whole. FIG. 11 shows an example in which other setting items Dm . . . and a monitor item Dd on the mold clamping device Mc side are displayed. The other setting items Dm . . . on the mold clamping device Mc side to be displayed may include a clamping force setting unit Vcq for setting the clamping force (molding clamping force) Pc, and a parting opening amount setting unit Xcs for setting the parting opening amount Lm. In the above-described example, the molding clamping force Pc and the parting opening amount Lm are set using another screen, but in this modified example, they are displayed using the non-display area Vco. When the clamping force setting unit Vcq and the parting opening amount setting unit Xcs are displayed like this, the setting of the molding clamping force Pc that may have an influence on the parting opening amount Lm can be made appropriately and easily while referring to the other setting items Ds . . . , that is, the molding injection pressure Pi by the injection pressure setting unit Vcp and the like displayed at the same time. As a monitor item Dd, it is possible to display an analog monitor display unit Vdp of the parting opening amount Lm obtained on a real-time basis. Thus, a changing state of the parting opening amount Lm with respect to time displayed in the graph data display unit Vcg and a real-time value (size) of the parting opening amount Lm displayed in the analog monitor display unit Vdp can be recognized at the same time, and the parting opening amount Lm can be monitored optimally due to a synergy effect therebetween.

Figure 12:
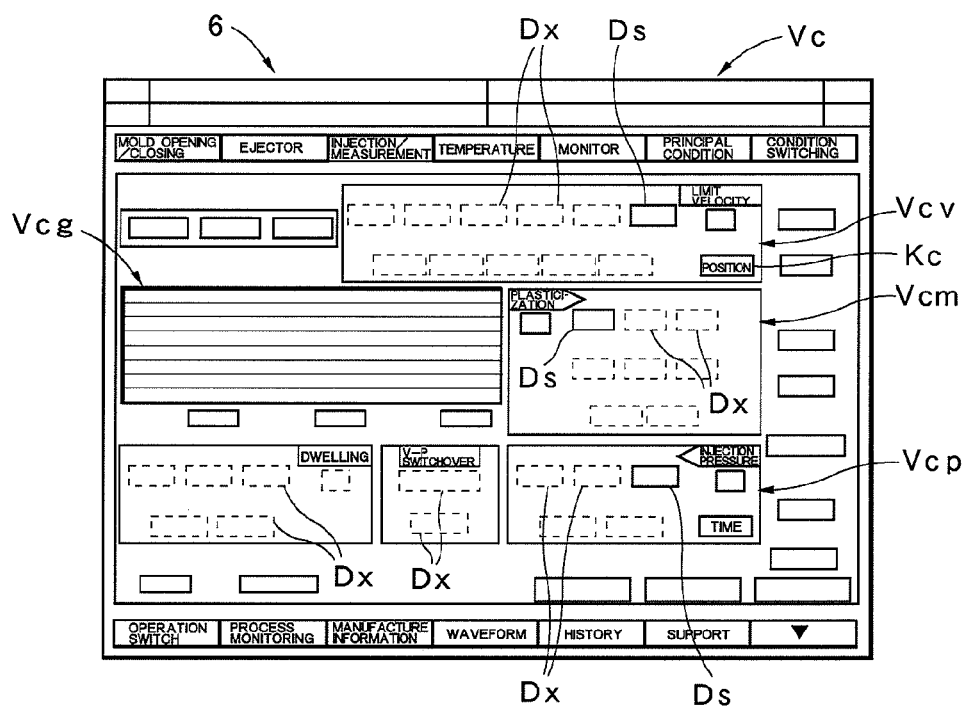
FIG. 12 is a view showing a display of the mold clamping side priority setting screen displayed by the control device, according to another modified example.

FIG. 12 shows an example in which the setting screen display function Fd allows setting items Vx . . . of the injection side priority setting screen Vi that are not required in the mold clamping side priority setting screen Vc to be displayed in the mold clamping side priority setting screen Vc with a different display color and/or display concentration. Setting of the unnecessary setting items Vx . . . of the injection side priority setting screen Vi cannot be made. This modified example has advantages of easily recognizing difference and relationship of the setting items Ds . . . between the mold clamping side priority setting screen Vc and the injection side priority setting screen Vi, and of using them as reference information for selecting either of the screens Vi and Vc.

Figure 13:
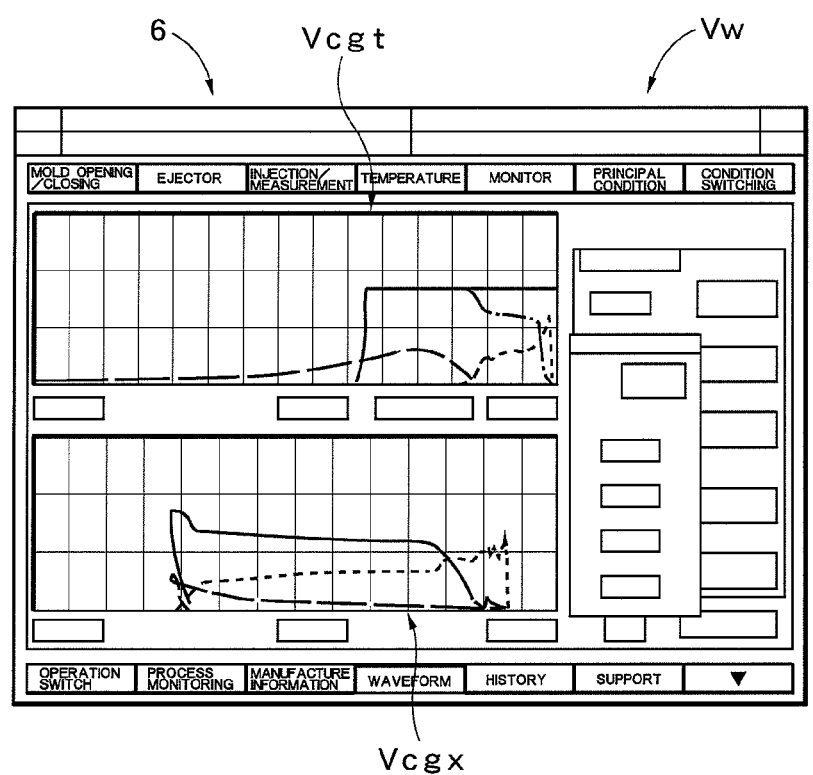
FIG. 13 is a view showing a waveform screen displayed according to the mold clamping side setting priority mode of the control device.

Meanwhile, FIG. 13 shows a waveform screen Vw that can be displayed when the mold clamping side setting priority mode Ec of the control device 1 according to this embodiment is switched to the waveform screen. As described above, the setting screen display function Fd has the function of displaying either the time axis or the position axis selected as the horizontal axis of the graph data display unit Vcg in the mold clamping side priority setting screen Vc. When the waveform screen Vw is selected as shown in FIG. 13, a graph data display unit Vcgt having the time axis as the horizontal axis and a graph data display unit Vcgx having the position axis as the horizontal axis can be displayed one above the other, with regard to the same property data. Thus, the changes in the property data at the time of molding with respect to the time and position can be recognized while making a comparison therebetween. This makes it possible to, for example, make fine adjustments to optimize the molding conditions easily, monitor the change data of the parting opening amount Lm and the like more appropriately, and perform the necessary data analysis easily and closely.

Although the optimum embodiment has been described in detail thus far, the present invention is not limited to such an embodiment, and change, addition, and deletion can be freely made for the detailed structure, shape, number, technique and the like, without departing from the spirit of this invention.

For example, the example is disclosed in which the setting screen display function Fd allows the injection side priority setting screen Vi and the mold clamping side priority setting screen Vc to display a part of or the entire setting units Viv . . . regarding the identical setting targets at the identical positions, but this is not to eliminate the cases where the display is made at the positions not identical to each other. Further, in the illustrated embodiment, the example is disclosed in which the molding processing using the mold clamping side setting priority mode Ec is tried when the molding processing using the injection side setting priority mode Ei fails to result in the excellent molding, but this is only an example of the usage methods. It is possible to select at will either the injection side setting priority mode Ei or the mold clamping side setting priority mode Ec for use. Although the reflection type distance measuring sensor 11s is shown as the clearance sensor 11, it is possible to use various sensors, such as a proximity sensor, capable of detecting the clearance with high accuracy and in a non-contact manner. Further, it is desirable that the predetermined remaining clearance Lmr between the movable mold 2m and the fixed mold 2c is caused after the elapse of the cooling time, but this is not to eliminate the case where the remaining clearance Lmr is not caused. Furthermore, the example of using the direct pressure type hydraulic mold clamping device as the injection molding machine M is disclosed, but a toggle system motor-operated mold clamping device may be used. In this case, the mold clamping is performed with a toggle link mechanism being in a non-lock-up state, so that the natural compression can be realized in the toggle system mold clamping device Mc with which the natural compression cannot be realized when used in an original manner. Thus, the mold clamping can be performed similarly to the case where the direct pressure type hydraulic mold clamping device is employed. Moreover, the disclosed permissible range of the molding clearance Lmp is 0.03 to 0.30 mm, and the disclosed permissible range of the remaining clearance Lmr is 0.01 to 0.10 mm, but these ranges are not restrictive and can be changed according to the type and the like of new resin R. Further, although it is desirable to set the molding injection pressure Pi to be the minimum value or its close value capable of molding the non-defective items, but this is not to eliminate the cases where the molding injection pressure Pi has the value other than the minimum value or its close value. Furthermore, the example is disclosed in which the oil pressure Po detected by the pressure sensor 12 in the hydraulic circuit 35 connected to the mold clamping cylinder 27 is used as the molding clamping force Pc, but the oil pressure inside the mold clamping cylinder 27 may be used, or the pressure in the mechanism such as the movable platen (movable mold) or the like may be used.

INDUSTRIAL APPLICABILITY

The control device according to this invention can be used in the various injection molding machines that include the molding machine controller for performing the molding by controlling the injection device and the mold clamping device.

REFERENCE SIGNS LIST

1: control device, 2: mold, 2m: movable mold, 2c: fixed mold, 3: heating cylinder, 4: screw, 5: molding machine controller, 6: display, Mc: mold clamping device, Mi: injection device, M: injection molding machine, Ei: injection side setting priority mode, Ec: mold clamping side setting priority mode, Fm: mode selecting function, Fd: setting screen display function, Vi: injection side priority setting screen, Vc: mold clamping side priority setting screen, Vco: non-display area, Viv: injection velocity setting unit, Vcv: limit velocity setting unit, Vim: measurement setting unit, Vcm: plasticization setting unit, Vip: limit pressure setting unit, Vcp: injection pressure setting unit, Vig: graph data display unit, Vcg: graph data display unit, Ds . . . : setting item, Dx . . . : unnecessary setting item, Dm . . . : other related items, Dd: other related items, Lm: parting opening amount

CITATION LIST

Patent Literature 1

JP-No. 55 (1980)-67435

Patent Literature 2

JP-No. 2007-118349

The invention claimed is:

1. A control device of an injection molding machine comprising:
a molding machine controller having a computer function to perform molding by controlling a mold clamping device that clamps, including opening and closing a mold and an injection device that injects and charges resin, plasticized and molten by rotation of a screw inside a heating cylinder, into the mold by advancement of the screw,
wherein the molding machine controller comprises:
a mode selecting function that selects either of an injection side setting priority mode or a mold clamping side setting priority mode,
the injection side setting priority mode being for injecting and charging the resin by giving priority to a molding condition set on an injection device side selected from the group consisting of an injection velocity setting, a measurement setting, a limit pressure setting, a velocity-pressure switchover point setting and a dwelling force setting, and
the mold clamping side setting priority mode being for injecting and charging the resin by giving priority to a molding condition set on a mold clamping device side selected from the group consisting of a limit velocity setting, a plasticization setting and a molding injection pressure setting, and
a setting screen display function for displaying on a display,
an injection side priority setting screen corresponding to the injection side setting priority mode when the injection side setting priority mode is selected, and
a mold clamping side priority setting screen corresponding to the mold clamping side setting priority mode when the mold clamping side setting priority mode is selected, and
when the mold clamping side setting priority mode is selected,
a graph data display unit having a time axis as a horizontal axis, and a graph data display unit having a position axis as the horizontal axis are displayed simultaneously on two sections of the display, one above the other, thereby enabling property data changes of the resin at a time of molding to be displayed as waveforms with respect to the time and a position, while making a comparison therebetween, so that
fine adjustments to optimize the molding conditions on each of the injection device side and the mold clamping device side is able to be made,
change data of a parting opening amount Lm of the mold is able to be monitored, and
data analysis is able to be performed.

2. The control device of the injection molding machine according to claim 1,
wherein the setting screen display function allows the injection side priority setting screen and the mold clamping side priority setting screen to display a part of or entire setting units regarding identical setting targets at identical positions, respectively, and allows the setting unit in the injection side priority setting screen, which is not required in the mold clamping side priority setting screen, to be not settable in the mold clamping side priority setting screen.

3. The control device of the injection molding machine according to claim 2,
wherein the setting screen display function prevents the setting unit in the injection side priority setting screen, which is not required in the mold clamping side priority setting screen, from being displayed in the mold clamping side priority setting screen, and provides a non-display area in the mold clamping side priority setting screen.

4. The control device of the injection molding machine according to claim 3,
wherein the setting screen display function displays other related items concerning the mold clamping side priority setting screen in the non-display area.

5. The control device of the injection molding machine according to claim 4,
wherein the other related items concerning the mold clamping side priority setting screen include a clamping force setting unit for setting a clamping force including a molding clamping force.

6. The control device of the injection molding machine according to claim 4,
wherein the other related items concerning the mold clamping side priority setting screen includes a parting opening amount setting unit for setting a predetermined clearance generated between a movable mold and a fixed mold of the mold when charging the resin, the predetermined clearance being a parting opening amount.

7. The control device of the injection molding machine according to claim 2,
wherein the setting screen display function allows a setting item in the injection side priority setting screen, which is not required in the mold clamping side priority setting screen, to be displayed with a different display color in the mold clamping side priority setting screen.

8. The control device of the injection molding machine according to claim 2,
wherein the setting screen display function allows the setting item in the injection side priority setting screen, which is not required in the mold clamping side priority setting screen, to be displayed with different display concentration in the mold clamping side priority setting screen.

9. The control device of the injection molding machine according to claim 2,
wherein the setting screen display function allows a limit velocity setting unit for setting the limit velocity of the injection velocity in the mold clamping side priority setting screen to be displayed at a corresponding position where an injection velocity setting unit for setting the injection velocity is displayed in the injection side priority setting screen.

10. The control device of the injection molding machine according to claim 2,
wherein the setting screen display function allows a plasticization setting unit for setting a plasticizing condition of the resin in the mold clamping side priority setting screen to be displayed at a corresponding position where the measurement setting unit for setting a measuring condition regarding an amount of the resin to be injected is displayed in the injection side priority setting screen.

11. The control device of the injection molding machine according to claim 2,
wherein the setting screen display function allows an injection pressure setting unit for setting an injection pressure in the mold clamping side priority setting screen to be displayed at a corresponding position where a limit pressure setting unit for setting the limit pressure of the injection pressure is displayed in the injection side priority setting screen.

12. The control device of the injection molding machine according to claim 1,
wherein the setting screen display function displays the position axis as the horizontal axis of the graph data display unit in the injection side priority setting screen, and can display the position axis selected as the horizontal axis of the graph data display unit in the mold clamping side priority setting screen.

13. The control device of the injection molding machine according to claim 1,
wherein the molding condition, to which the priority is given by the injection side setting priority mode, includes an injection velocity to advance the screw.

14. The control device of the injection molding machine according to claim 1,
wherein the molding condition, to which the priority is given by the injection side setting priority mode, includes a measuring condition regarding to an amount of the resin to be injected.

15. The control device of the injection molding machine according to claim 1,
wherein the molding condition, to which the priority is given by the mold clamping side setting priority mode, includes a predetermined clearance generated between a movable mold and a fixed mold of the mold when charging the resin, the predetermined clearance being a parting opening amount.

\* \* \* \* \*